L. WHITCOMB.
FRICTION DEVICE.
APPLICATION FILED JULY 10, 1907.

917,220.

Patented Apr. 6, 1909.

Witnesses.
C. H. Gunnett
J. Murphy

Inventor:
Lawrence Whitcomb
by Jas. H. Churchill
atty.

UNITED STATES PATENT OFFICE.

LAWRENCE WHITCOMB, OF BROOKLINE, MASSACHUSETTS, ASSIGNOR TO NATIONAL BRAKE AND CLUTCH COMPANY, OF BOSTON, MASSACHUSETTS, A CORPORATION.

FRICTION DEVICE.

No. 917,220.      Specification of Letters Patent.      Patented April 6, 1909.

Application filed July 10, 1907. Serial No. 383,045.

*To all whom it may concern:*

Be it known that I, LAWRENCE WHITCOMB, a citizen of the United States, residing in Brookline, in the county of Norfolk and State of Massachusetts, have invented an Improvement in Friction Devices, of which the following description, in connection with the accompanying drawings, is a specification, like letters on the drawings representing like parts.

This invention relates to a device having a plurality of holes or openings in which are inserted blocks, sections or pieces of cork, to form a friction surface of increased efficiency.

The present invention has for its object to provide the device with means for holding the cork inserts and for retaining them in their openings.

The invention is especially designed and adapted for use in pulleys, wheels, bands, straps or other metal bodies, which are substantially thin and do not possess the required thickness for holding and retaining the inserts.

In accordance with this invention, the pulley, band or other device is provided on its inner side with prongs or projections extended from the opening in said device and adapted to engage the cork insert and hold the same in its opening. The holding prongs or projections may be made integral with the device and formed when the hole or opening therein is made, and said prongs or projections may also serve as holding means for a socket piece into which the cork insert is extended.

These and other features of this invention will be pointed out in the claims at the end of this specification.

Figure 1:
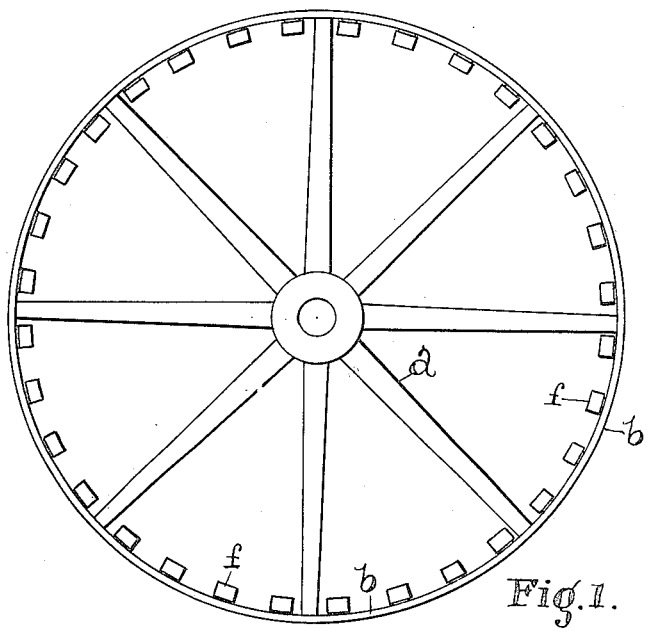
Figure 2:
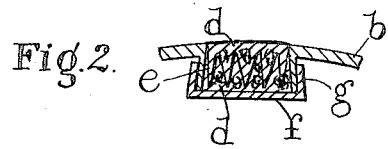
Figure 3:
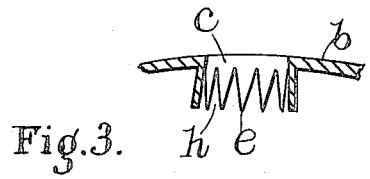

Figure 1 is a side elevation of a pulley or wheel embodying this invention, and Figs. 2 and 3, sectional details to be referred to.

In the present instance I have shown the invention as embodied in a pulley or wheel $a$, but I do not desire to limit my invention in this respect, as it is equally applicable to any device of substantially thin metal, the frictional efficiency of which it is desired to increase, such for instance as brake bands, straps, etc.

The metal rim $b$ of the pulley, is provided with a plurality of holes or openings $c$ (see Fig. 3), into which are inserted, blocks, sections or pieces $d$ of cork, or other non-metallic material, and which are retained therein by holding prongs or projections $e$, which surround the said openings and are preferably integral with the rim $b$, being formed by forcing the walls of the openings inwardly after the manner represented in Figs. 2 and 3. The prongs or projections $e$ may also serve to hold a socket piece or cup $f$ into which the cork insert is extended and by which it is protected, which may be accomplished by expanding the lower ends of the prongs to a larger diameter than the hole or opening $c$ in the rim $b$ and into engagement with converging or tapering side walls $g$ of the socket piece as clearly shown in Fig. 2, wherein it will be seen that the outer or lower end of the socket piece is of greater width or diameter than the inner or upper portion of the same, which allows the lower portion of the cork insert $d$ to expand to a greater diameter than the opening in the rim, thus offering a resistance to the cork insert working out through the opening $c$ and serving to help retain said cork insert in the opening in the rim or band. The socket pieces $f$ also serve to prevent the cork from being forced through the opening from the outer side of the rim. So also the prongs $e$ are separated from one another at their free ends, thereby forming spaces $h$ into which the cork may be forced in its expansive movement and thus form a locking engagement with the said prongs, which serves to retain the cork insert in its opening.

Claims.

1. In combination, a substantially thin metal body having a plurality of holes or openings, and a plurality of prongs or projections surrounding said openings and integral with said body, socket pieces secured to said body by said prongs or projections, and cork sections inserted through said openings into said socket pieces, substantially as described.

2. In combination, a substantially thin metal body having a plurality of holes or openings, and a plurality of prongs or projections surrounding said openings and integral with said body, and cork sections inserted through said openings and engaging said prongs, substantially as described.

3. In combination, a substantially thin metal body portion having a plurality of holes or openings, cork sections inserted through said openings, and prongs or projections attached to said body and extended away from said openings to engage said cork sections, and to form openings between them into which the rear portion of the cork sections may expand substantially as described.

In testimony whereof, I have signed my name to this specification in the presence of two subscribing witnesses.

LAWRENCE WHITCOMB.

Witnesses:
JAS. H. CHURCHILL,
J. MURPHY.